United States Patent [19]

Miyawaki

[11] Patent Number: 4,771,658
[45] Date of Patent: Sep. 20, 1988

[54] SYSTEM FOR CONTROLLING THE PRESSURE OF OIL IN A SYSTEM FOR A CONTINUOUSLY VARIABLE TRANSMISSION

[75] Inventor: Motohisa Miyawaki, Tokyo, Japan
[73] Assignee: Fuji Jukogyo Kabushiki Kaisha, Tokyo, Japan
[21] Appl. No.: 900,216
[22] Filed: Aug. 26, 1986
[30] Foreign Application Priority Data Aug. 30, 1985 [JP] Japan ................. 60-191046

[51] Int. Cl.$^4$ ............................................. B60K 41/16
[52] U.S. Cl. ............................................ 74/866; 74/868
[58] Field of Search .................... 74/866, 867, 868; 474/18, 28

[56] References Cited

U.S. PATENT DOCUMENTS

| | | | |
|---|---|---|---|
| 4,369,675 | 1/1983 | van Deursen | 74/864 |
| 4,387,608 | 6/1983 | Mohl et al. | 74/866 |
| 4,458,318 | 7/1984 | Smit et al. | 74/866 X |
| 4,466,521 | 8/1984 | Hattori et al. | 74/866 X |
| 4,475,416 | 10/1984 | Underwood | 74/868 |
| 4,515,040 | 5/1985 | Takeuchi et al. | 74/866 |
| 4,546,673 | 10/1985 | Shigematsu et al. | 74/869 X |
| 4,551,119 | 11/1985 | Sugaya et al. | 474/28 |
| 4,606,446 | 8/1986 | Watanabe | 192/0.076 |
| 4,631,043 | 12/1986 | Tokoro et al. | 474/18 |
| 4,653,353 | 3/1987 | Itoh et al. | 74/868 |
| 4,665,773 | 5/1987 | Hiramatsu et al. | 74/866 |
| 4,672,864 | 6/1987 | Morimoto | 74/866 |
| 4,680,990 | 7/1987 | Ohgami | 74/868 |

FOREIGN PATENT DOCUMENTS 58-214054 12/1983 Japan.

Primary Examiner—Leslie A. Braun
Assistant Examiner—Dwight G. Diehl
Attorney, Agent, or Firm—Martin A. Farber

[57] ABSTRACT

A control system for a motor vehicle provided with a clutch and a continuously variable transmission. The transmission has a line pressure control valve having ports and a spool for controlling the line pressure of oil supplied to a cylinder of a pulley device to change the transmission ratio. The transmitting torque in an engine power transmission system is detected and a clutch torque dependent on the transmitting torque is obtained. The line pressure is set to a minimum value sufficient for holding a belt of the pulley device for transmitting the clutch torque.

15 Claims, 7 Drawing Sheets

SYSTEM FOR CONTROLLING THE PRESSURE OF OIL IN A SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for controlling line pressure in a hydraulic circuit for the transmission.

A known control system for a continuously variable belt-drive transmission disclosed in U.S. Pat. No. 4,369,675 comprises an endless belt running over a drive pulley and a driven pulley. Each pulley comprises a movable conical disc which is axially moved by a fluid operated servo device so as to vary the running diameter of the belt on the pulleys in dependency on driving conditions. The system is provided with a hydraulic circuit including a pump, a line pressure control valve and a transmission ratio control valve. Each valve comprises a spool to control the oil supplied to the servo devices.

The transmission ratio control valve operates to determine the transmission ratio in accordance with the opening degree of a throttle valve of an engine and the speed of the engine. The line pressure control valve is adapted to control the line pressure in accordance with the transmission ratio and the engine speed. The line pressure is controlled to prevent the belt from slipping on the pulleys in order to transmit the output of the engine.

Japanese Patent Laid Open No. 58-214054 discloses a hydraulic control system for controlling the line pressure to minimum value, while the belt is prevented from slipping by detecting the slipping thereof. Since the control of the line pressure is performed by detecting the slipping of the belt, the response of this control operation is liable to delay. Further, if engine torque changes rapidly, the belt will slip on the pulleys because of the delay of the control operation.

SUMMARY OF THE INVENTION

The object of the present invention is to provide a transmission control system which controls line pressure to a minimum value in accordance with engine torque, so that the belt of a transmission is prevented from slipping on the pulleys, and in which if the engine torque changes quickly, the change of the engine torque is not transmitted to the transmission. In the system of the present invention, the transmitting torque in an engine power transmission system is detected and a clutch torque dependent on the transmitting torque is obtained. The line pressure is set to a minimum value sufficient for holding the belt of the pulley device for transmitting the clutch torque.

The other objects and features of this invention will become understood from the following description with reference to the accompanying drawings.

DETAILED DESCRIPTION OF THE PREFERRED EMBODIMENT

Figure 1:
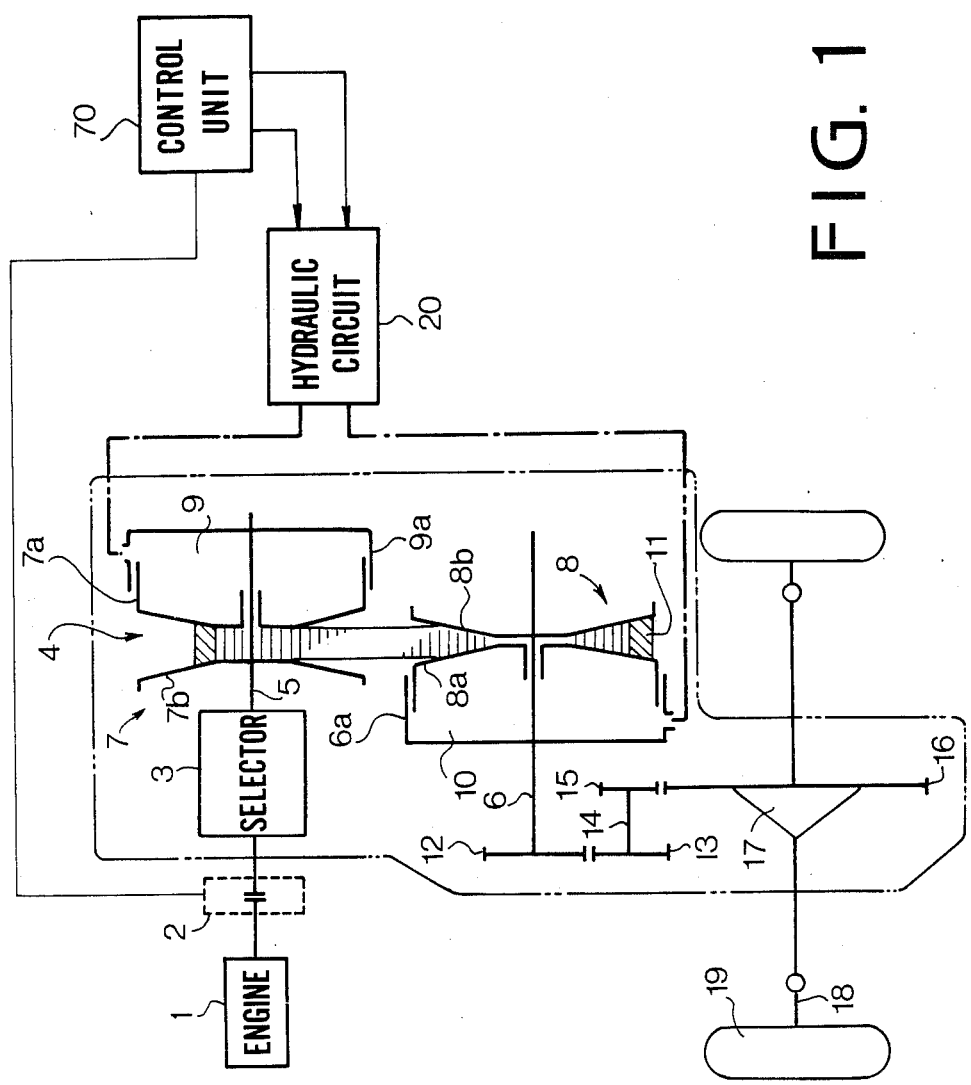
FIG. 1 is a schematic illustration of a continuously variable belt-drive transmission.

Referring to FIG. 1, a motor vehicle is provided with an engine 1, an electromagnetic powder clutch 2 for transmitting the power of the engine to a continuously variable belt-drive transmission 4 through a selector mechanism 3.

The belt-drive transmission 4 has a main shaft 5 and an output shaft 6 provided in parallel with the main shaft 5. A drive pulley (primary pulley) 7 and a driven pulley (secondary pulley) 8 are mounted on shafts 5 and 6 respectively. A fixed conical disc 7b of the drive pulley 7 is integral with main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite a movable conical disc 8a which has a cylindrical portion which is slidably engaged in a cylinder 6a of the output shaft 6 to form a servo device. A chamber 10 of the servo device is also communicated with the hydraulic control circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final gear 16. The rotation of the final gear 16 is transmitted to axles 18 of vehicle driving wheels 19 through a differential 17.

Figure 2A:
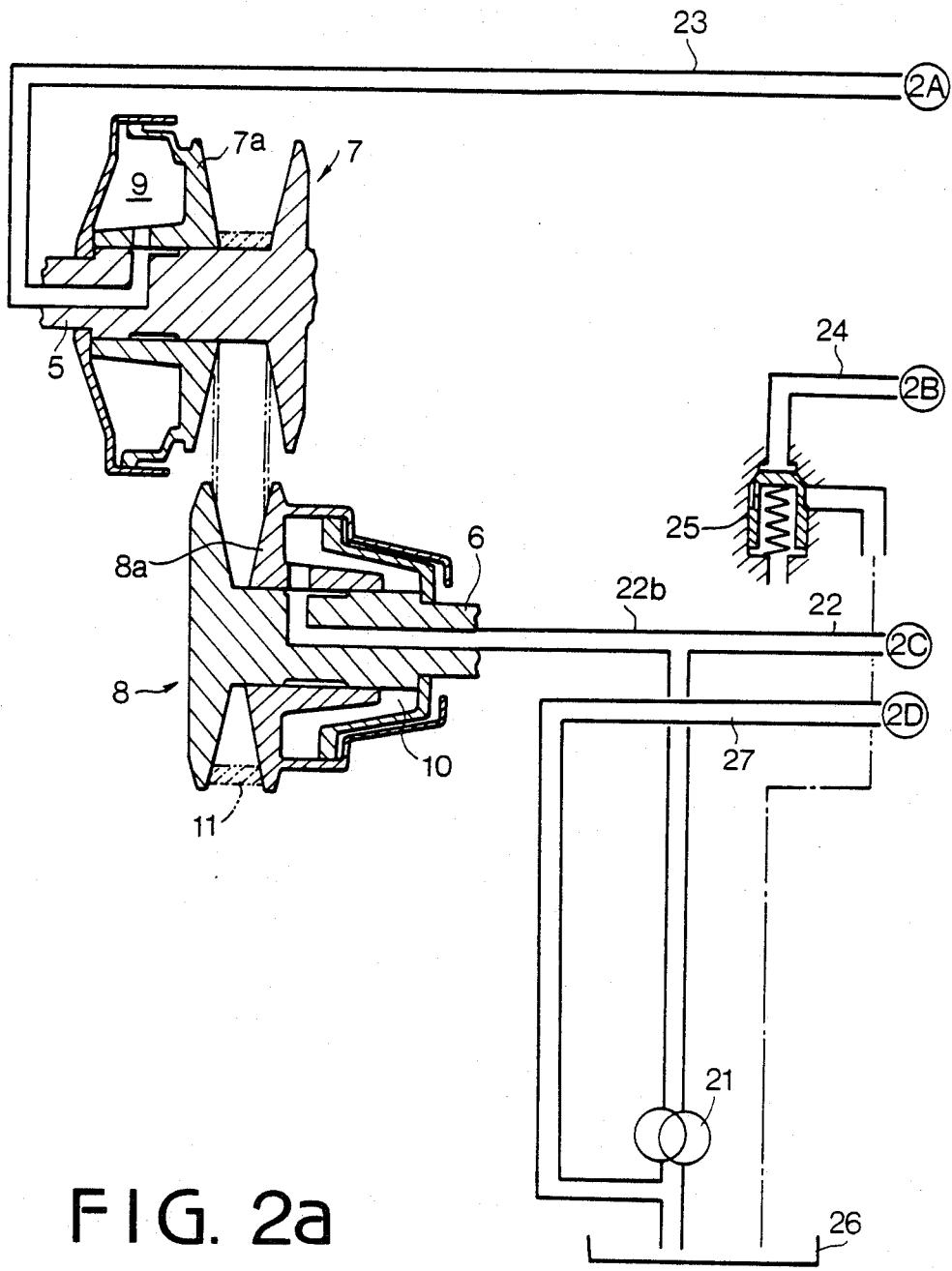
FIGS. 2a and 2b are schematic diagrams showing a control system according to the present invention.
Figure 2B:
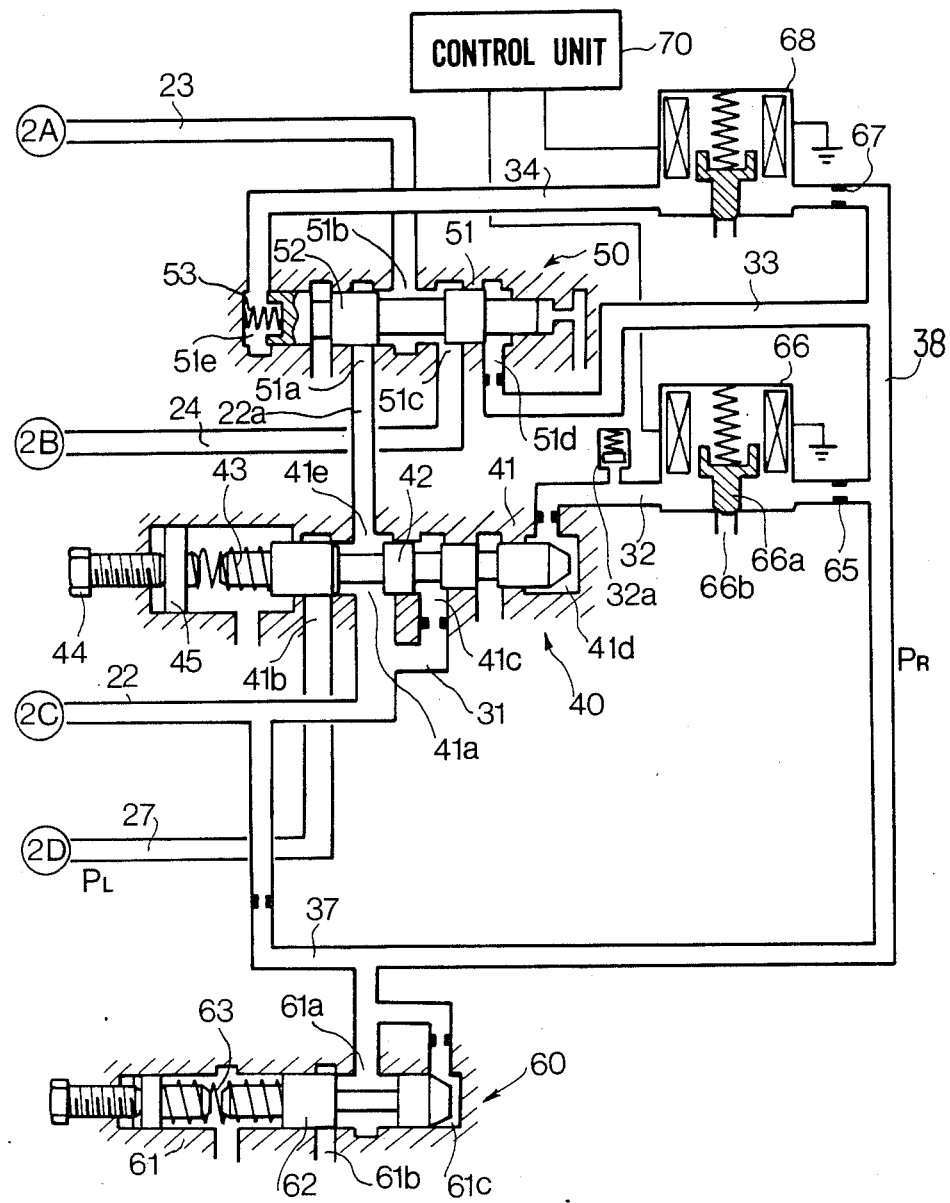

Referring to FIGS. 2a and 2b, chamber 9 of the drive pulley 7 is supplied with pressurized oil by an oil pump 21 from an oil reservoir 26 passing through a line pressure conduit 22, ports 41a and 41e of a line pressure control valve 40, a transmission ratio control valve 50, and a conduit 23. The chamber 10 of driven pulley 8 is applied with pressurized oil through a passage 22b without passing through valves 40 and 50. The movable conical disc 7a of the drive pulley 7 is so designed that the pressure receiving area thereof is larger than that of the movable conical disc 8a of the driven pulley 8. The line pressure control valve 40 comprises a valve body 41, spool 42, and chambers 41c and 41d. The spool 42 is applied with pressure of the pressurized oil in the chamber 41c supplied through a conduit 31. The other end of the spool 42 is applied with the force of a spring 43 provided between the end of the spool 42 and a retainer 45, the position of which is adjustable by a screw 44. The port 41a is communicated with a drain port 41b for a drain passage 27 in accordance with the position of a land of the spool 42. The drain port 41b communicates with the oil reservoir 26 through passage 27.

The transmission ratio control valve 50 comprises a valve body 51, a spool 52, and a spring 53 for urging the spool 52 in the downshift direction. A port 51b of the valve body 51 is selectively communicated with a pressure oil supply port 51a or a drain port 51c in accordance with the position of lands of spool 52. Port 51b communicates with chamber 9 through conduit 23, and port 51a communicates with port 41e of line pressure control valve 40 through conduit 22a. The drain port 51c is communicated with the oil reservoir 26 through a conduit 24 and a check valve 25.

The system is provided with a regulator valve 60, and solenoid operated on-off control valves 66 and 68.

The regulator valve 60 comprises a valve body 61, inlet port 61a connected to the pump 21 through passages 37, 22, spool 62, end chamber 61c connected to the passage 37, and a spring 63 urging the spool 62 to toward the chamber 61c. When the pressure of oil in the chamber 61c becomes higher than a set value, the spool 62 is shifted to the left, so that an inlet port 61a communicates with a drain port 61b to drain the oil. Thus, a constant pressure of oil is provided in the passage 37.

The passage 37 is communicated with the chamber 41d of line pressure control valve 40 through a constant pressure passage 38, orifice 65, the solenoid operated on-off valve 66, and passage 32 having an accumulator 32a. Further, the passage 38 is communicated with an end chamber 51d of the transmission ratio control valve 50 through a passage 33, and with another end chamber 51e through a passage 34, orifice 67, and the solenoid operated on-off valve 68. The solenoid operated on-off valve 66 is adapted to be operated by pulses. When energized, a valve 66a opens a drain port 66b. The pulsations of the pressure of oil in the passage 32 is smoothed by the accumulator 32a. The solenoid operated valve on-off 68 is the same as valve 66 in construction and operation. The control valves 66 and 68 are operated by signals from a control unit 70. Thus, pressure controlled by the control valves 66 and 68 is applied to chambers 41d and 51e.

In the transmission ratio control valve 50, the pressure receiving area of the spool 52 at chamber 51e is set to a value larger than the area at the chamber 51d. On the other hand, the control pressure in the chamber 51e can be changed between a maximum value, which is the same as the constant pressure in the chamber 51d, when the duty ratio is 0% and zero by controlling the duty ratio of the pulses for operating the control valve 68. The transmission ratio control valve 50 is so arranged that the spool 52 is at a neutral position at a middle duty ratio (for example 50%) and is located in an oil supply position by increasing the duty ratio from the middle duty ratio because of reduction of the control pressure in the chamber 51e. Further, the speed of the movement of the spool 52 increases with decreasing of the duty ratio. The spool 52 is shifted to an oil drain position by decreasing the duty ratio. It will be understood that when the oil is supplied to the chamber 9, the transmission is upshifted.

Figure 3A:
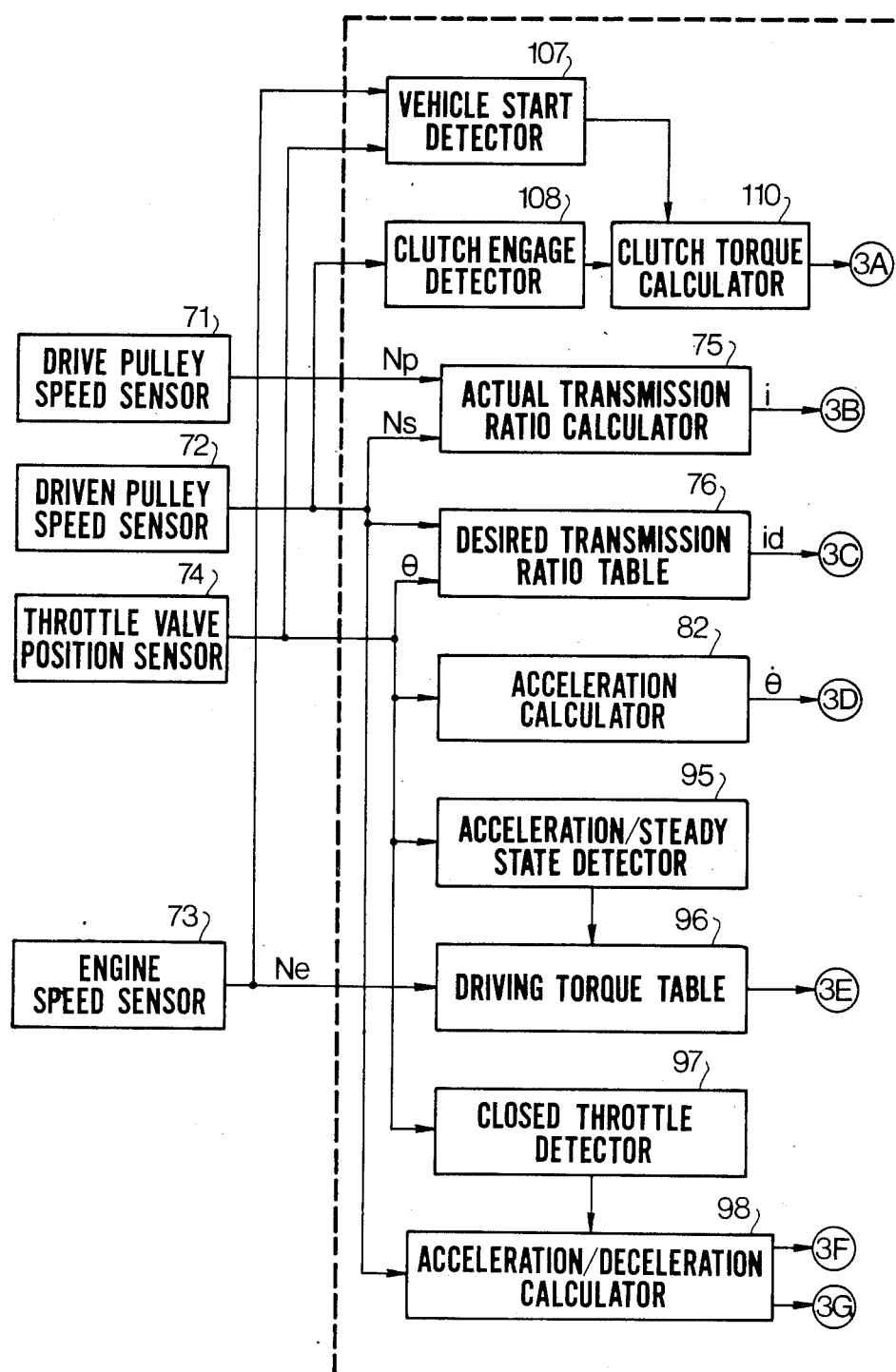
FIGS. 3a and 3b are block diagrams showing a control unit.
Figure 3B:
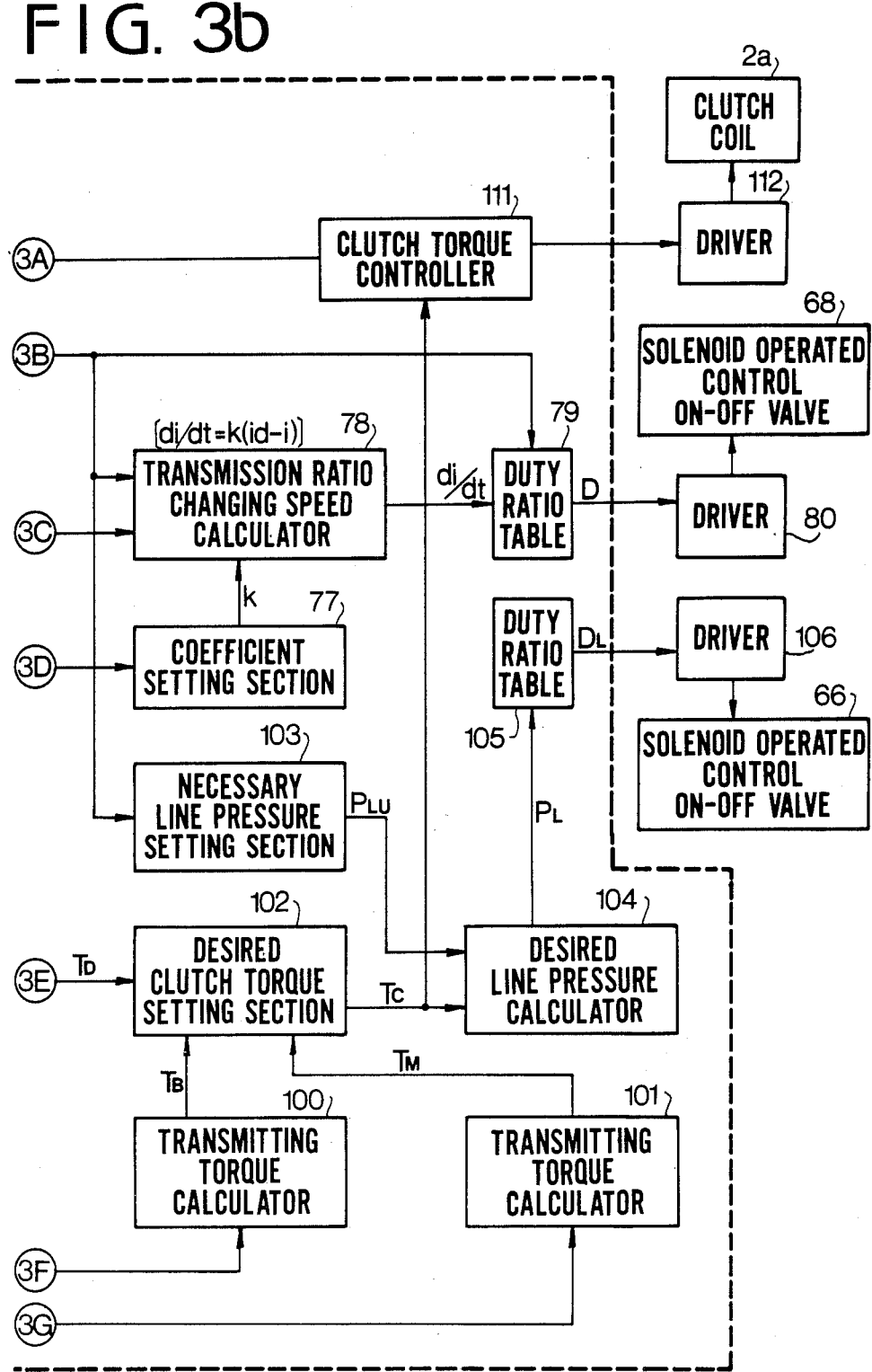
Figure 4A:
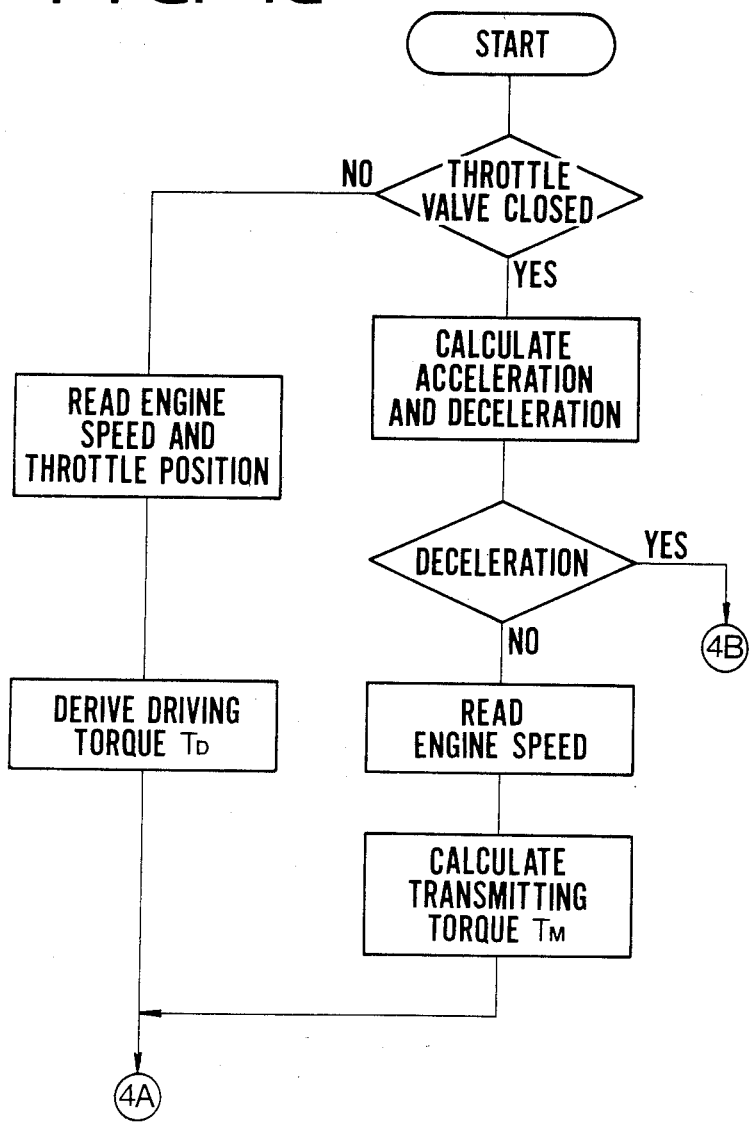
FIGS. 4a and 4b are flowcharts showing the operation of the control system.
Figure 4B:
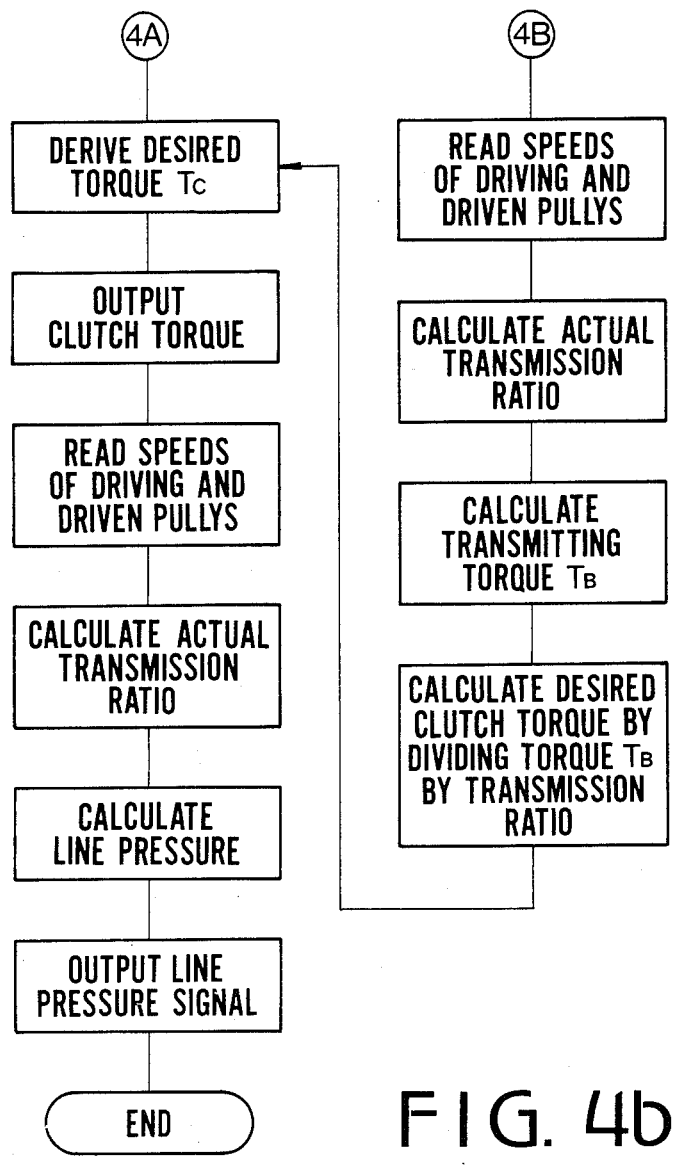

Referring to FIGS. 3a and 3b, a drive pulley speed sensor 71, driven pulley speed sensor 72, engine speed sensor 73 and throttle valve position sensor 74 are provided. Output signals $N_p$ and $N_s$ of sensors 71, 72 are fed to an actual transmission ratio calculator 75 to produce an actual transmission ratio i in accordance with $i=N_p/N_s$. Output signals $N_s$ and $\theta$ of the throttle valve position sensor 74 are fed to a desired transmission ratio table 76. The desired transmission ratio id is fetched from the table 76 in accordance with the signals $N_s$ and $\theta$. On the other hand, the output signal $\theta$ is fed to an acceleration calculator 82 to obtain acceleration $\dot\theta$. The signal of the acceleration is supplied to a coefficient setting section 77 to produce a coefficient K. The actual transmission ratio i, desired transmission ratio id and coefficient K from the coefficient setting section 77 are applied to a transmission ratio changing speed calculator 78 to produce a transmission ratio changing speed di/dt from the formula $di/dt = K(id - i)$.

The speed di/dt and the actual transmission ratio i are applied to a duty ratio table 79 to derive the duty ratio D. The duty ratio D is supplied to the solenoid operated valve 68 through a driver 80.

On the other hand, the output signal $\theta$ of throttle position sensor 74 is fed to an acceleration/steady state position detector 95. The output of the detector 95 and the output $N_e$ of engine speed sensor 73 are fed to a driving torque table 96, so that driving torque $T_D$ is derived from the table based on throttle position $\theta$ and engine speed Ne.

Further, the output $\theta$ is applied to a closed throttle detector 97 which produces an output when the output $\theta$ is zero. The output of the detector 97 and output $N_s$ of driven pulley speed sensor 72 are supplied to an acceleration/deceleration calculator 98 which calculates magnitudes of acceleration and deceleration and produces an acceleration/decleration signal. The output of the calculator 98 at deceleration is applied to a transmitting torque calculator 100 which produces a torque signal $T_B$ dependent on the weight of the vehicle and the magnitude of deceleration. The output of calculator 98 at acceleration (for example, at downhill coasting) is applied to a transmitting torque calculator 101 which produces a torque signal $T_M$ dependent on engine speed.

Torque signals $T_D$, $T_B$ and $T_M$ are applied to a desired clutch torque setting section 102 which produces a desired torque $T_C$ in accordance with the torque signals.

On the other hand, the actual transmission ratio i from the calculator 75 is applied to a necessary line pressure table 103 to derive a necessary line pressure $P_{LU}$ per unit torque. The necessary line pressure $P_{LU}$ and the clutch torque $T_C$ are applied to a desired line pressure calculator 104 which calculates a desired line pressure $P_L$ which is slightly higher by a coefficient than a line pressure for transmitting the clutch torque. The desired line pressure $P_L$ is expressed as follows:

$$P_L = P_{LU} \times T_C + \alpha$$

The desired line pressure $P_L$ is applied to a duty ratio table 105 to derive a duty ratio $D_L$ corresponding to the line pressure $P_L$. The duty ratio $D_L$ is supplied to a driver 106 which operates the solenoid operated on-off valve 66 at the duty ratio.

Further, the outputs Ne and $\theta$ of engine speed sensor 73 and throttle position sensor 74 are supplied to a vehicle start detector 107 and the output $N_S$ of driven pulley speed sensor 72 is applied to a clutch engage detector 108. Outputs of both detectors 107 and 108 are fed to a clutch torque calculator 110 to produce a clutch current signal which is supplied to a clutch torque controller 111. A clutch current is corrected to a value corresponding to the desired clutch torque dependent on the clutch torque $T_C$ from the section 102. The corrected clutch current is applied to a clutch coil 2a of the clutch 2 through a driver 112 to control the clutch.

In operation, while the vehicle is at a stop, chamber 10 of the driven pulley 8 is supplied with line pressure through passage 22b, and the chamber 9 of the drive pulley 7 is drained, since $N_p$, $N_s$, $\theta$ are zero and duty ratio D is zero, and the spool 52 is at the right end position and the drain port 51c communicates with the chamber 9 through the conduit 23 as shown in FIGS. 2a and 2b. Thus, in the pulley and belt device of the continuously variable belt-drive transmission, the driving belt 11 engages with the driven pulley 8 at a maximum running diameter to provide the largest transmission ratio (low speed stage). When the accelerator pedal is depressed, the clutch current increases progressively, so that the electromagnetic clutch 2 is gradually engaged, transmitting the engine power to the drive pulley 7. The power of the engine is transmitted to the output shaft 6 at the largest transmission ratio by the driving belt 11 and driven pulley 8, and further transmitted to axles 18 of the driving wheels 19. Thus, the vehicle is started.

At that time the line pressure is at the highest value by the pressure control valve 40, since the duty ratio for the valve 66 is large, and the spool 42 of the line pressure control valve 40 is at the right end position. When the throttle valve is opened for acceleration, the desired transmission ratio id and transmission ratio changing speed di/dt are calculated by calculators 76, 78, and duty ratio D is obtained from the table 79. The value of the duty ratio D is larger than the neutral value, so that the pressure in the chamber 51d of the control valve 50 is higher than the chamber 51e. Thus, the spool 52 is shifted to the left to communicate the port 51a with port 51b, so that oil is supplied to the chamber 9 through the conduit 23. On the other hand, the duty ratio for the control valve 66 is reduced, thereby shifting the spool 42 of the valve 40 to the left. The port 41a communicates with the port 41b of the drain passage 27. Thus, the line pressure reduces, and the transmission is upshifted, since oil is still supplied to the chamber 9 through the control valve 50. During the driving, the clutch torque is set to a value approximately equal to the driving torque $T_D$ by the desired clutch torque $T_C$.

The control operation of the line pressure will be described hereinafter with reference to FIGS. 2a, 2b, 3a, 3b, 4a and 4b. From the table 96, the driving torque $T_D$ is obtained in accordance with throttle position $\theta$ and engine speed $N_e$, which is applied to the desired clutch torque setting section 102. The section 102 produces desired clutch torque $T_C$ which is applied to clutch torque controller 111 to engage the clutch 2.

On the other hand, desired line pressure calculator 104 calculates a desired line pressure $P_L$ which is slightly higher than a line pressure necessary for transmitting the clutch torque $T_C$. The solenoid operated on-off valve 66 is operated at a duty ratio corresponding to the desired line pressure $P_L$. The line pressure is applied to chamber 10 to hold the belt 11 at a necessary minimum force, the transmitting torque at which is slightly larger than torques $T_D$ and $T_C$ respectively. Thus, power is transmitted through the transmission without slipping of the belt. When the transmitting torque changes rapidly, the clutch 2 slips, since the transmitting torque at the belt 11 is larger than the clutch torque. Accordingly, the change of transmitting torque is not transmitted to the transmission.

When the throttle valve is closed, transmitting torque calculator 100 or 101 produces a torque signal $T_B$ or $T_M$ in accordance with the acceleration/deceleration signal output of acceleration/deceleration calculator 98. Accordingly, the desired torque $T_C$ is corrected by the torque signal $T_B$ or $T_M$, so that the clutch torque is corrected and the line pressure is set to such a value that the transmitting torque at the belt becomes slightly larger than the transmitting torque $T_B$ or $T_M$.

Although an electromagnetic clutch is employed in the above described system, other clutches or torque converters can be used.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In a control system for a continuously variable transmission for transmitting the power of an internal combustion engine having a throttle valve to driving wheels of a motor vehicle through a clutch, the transmission having a drive pulley including a hydraulically shiftable disc and a first hydraulic cylinder for shifting the disc, a driven pulley including a hydraulically shiftable disc and a second hydraulic cylinder for operating the disc of the driven pulley, and a belt engaged with both pulleys, the control system having a line pressure control valve having ports and a shiftable spool, a transmission ratio control valve having ports and a shiftable spool, and a first hydraulic circuit having a pump for supplying oil regulated by the line pressure control valve to the first hydraulic cylinder via the transmission ratio control valve and to said second hydraulic cylinder, the improvement in the system comprising:

a second hydraulic circuit for supplying control oil to the line pressure control valve so as to shift the spool of the line pressure control valve;

control valve means provided in the second hydraulic circuit for controlling the amount of the control oil supplied to the line pressure control valve;

sensor means for sensing operating conditions and for producing first signals;

first means responsive to at least one of the first signals for producing an engine torque representing engine torque in acceleration state and steady state respectivley;

second means responsive to at least one of the first signals when the throttle valve is closed during driving of the vehicle for producing an acceleration/deceleration signal representing engine braking conditions;

third means responsive to the engine torque signal for producing a second signal representing a cluch torque necessary to transmit said engine torque through the clutch;

fourth means responsive to the second signal for producing a third signal representing a desired line pressure in the first hydraulic circuit providing a transmitting torque at the belt larger than the clutch torque;

fifth means responsive to the third signal for operating said control valve means so as, via the line pressure control valve, to provide the desired line pressure in the first hydraulic circuit, the transmitting torque at the belt provided by said desired line pressure being larger than the clutch torque;

sixth means responsive to the acceleration/deceleration signal in deceleration state for producing a first correcting signal dependent on weight of the vehicle, and, respectively, in acceleration state for producing a second correcting signal dependent on engine speed; and said third means being responsive to the first correcting signal and the second correcting signal respectively for correcting the second signal to provide a clutch torque and a transmitting torque so as to provide an engine braking effect.

2. The control system according to claim 1 wherein the control valve means is a solenoid operated on-off valve.

3. The control system according to claim 1, wherein the second hydraulic circuit is provided with a regulator valve for maintaining the pressure of the control oil in said second hydraulic circuit at a constant value.

4. The control system according to claim 1, wherein said clutch is connected between the engine and said drive pulley.

5. The control system according to claim 4, wherein said clutch is an electromagnetic clutch.

6. The control system according to claim 5, wherein said clutch is an electromagnetic powder clutch.

7. The control system according to claim 4, wherein said first signals comprise an engine speed signal dependent on engine speed, and a vehicle speed signal dependent on vehicle speed, said first means is responsive to said engine speed signal, and said second means is responsive to said vehicle speed signal.

8. The control system according to claim 7, wherein said signals further comprise a throttle valve position signal dependent on degree of opening of the throttle valve, and said first and second means are further responsive to said throttle valve position signal.

9. The control system according to claim 1, wherein said sixth means produces said first correcting signal dependent on magnitude of deceleration as well as on the weight of the vehicle.

10. The control system according to claim 1, wherein said third means corrects the clutch torque in response to said first and second correcting signals, respectively, by providing a signal representing the clutch torque which represents said first correcting signal and said second correcting signal, respectively.

11. The control system according to claim 1, wherein said first signals comprise a throttle valve position signal dependent on degree of opening of the throttle valve, and said first and second means are further responsive to said throttle valve position signal.

12. The control system according to claim 1, wherein said sixth means comprises a transmitting torque calculator.

13. The control system according to claim 1, further comprising seventh means for providing a fourth signal representing a desired line pressure in the first hydraulic circuit providing a transmitting torque at the belt dependent on actual transmission ratio of the transmission, said fourth means is further responsive to said fourth signal for providing said third signal.

14. The control system according to claim 1, wherein said fourth means provides said third signal representing a value of said second signal times said fourth signal plus a coefficient.

15. In a control system for a belt type continuously variable transmission for transmitting the power of an internal combustion engine having a throttle valve to driving wheels of a motor vehicle through a clutch, the transmission having a drive pulley including a hydraulically shiftable disc and a first hydraulic cylinder for shifting the disc, a driven pulley including a hydraulically shiftable disc and a second hydraulic cylinder for operating the disc of the driven pulley, and a belt engaged with both pulleys, the control system having a line pressure control valve having ports and a shiftable spool, a transmission ratio control valve having ports and a shiftable spool, and a first hydraulic circuit having a pump for supplying oil regulated by the line pressure control valve to the first hydraulic cylinder via the transmission ratio control valve and to said second hydraulic cylinder, the improvement in the system comprising:

a second hydraulic circuit for supplying control oil to the line pressure control valve so as to shift the spool of the line pressure control valve;

control valve means provided in the second hydraulic circuit for controlling the amount of the control oil supplied to the line pressure control valve;

sensor means sensing vehicle parameters and outputting signals indicative thereof;

first means responsive to the sensor signals and outputting an engine torque signal;

second means responsive to the sensor signals such that when the throttle valve is closes said second means outputs an acceleration/deceleration signal;

third means responsive to the engine torque signal to produce a clutch torque signal;

fourth means responsive to the clutch torque signal to output a second signal indicating desired line pressure such that the belt type continuously variably transmission will transmit a torque larger than the clutch;

fifth means responsive to the second signal to operate the control valve means to control the line pressure control valve to generate the desired pressure;

sixth means responsive to the acceleration/deceleration signal such that it produces a first correcting signal dependent on vehicle weight when in deceleration state and a second correcting signal dependent on engine speed when in the acceleration state; and the third means being responsive to the correcting signals to correct the clutch torque signal which is received by the fourth means to correct the second signal.

* * * * *